(12) United States Patent
Pan et al.

(10) Patent No.: US 8,389,587 B2
(45) Date of Patent: Mar. 5, 2013

(54) MICROPOROUS POLYMER SEPARATORS FOR LITHIUM ION BATTERIES AND METHOD FOR PRODUCING THE SAME

(75) Inventors: Zhonglai Pan, Sichuan (CN); Zhenghua Deng, Sichuan (CN); Rengui Li, Sichuan (CN); Lu Wang, Sichuan (CN); Jiamin Deng, Sichuan (CN); Hongchang Du, Sichuan (CN); Jiandong Gao, Sichuan (CN); Jishuan Suo, Sichuan (CN)

(73) Assignee: Changzhou Zhongke Laifang Power Development Co., Ltd., Changzhou (CN)

( * ) Notice: Subject to any disclaimer, the term of this patent is extended or adjusted under 35 U.S.C. 154(b) by 629 days.

(21) Appl. No.: 12/665,328

(22) PCT Filed: Oct. 31, 2008

(86) PCT No.: PCT/CN2008/072889
§ 371 (c)(1), (2), (4) Date: Dec. 17, 2009

(87) PCT Pub. No.: WO2009/079946
PCT Pub. Date: Jul. 2, 2009

(65) Prior Publication Data
US 2010/0178545 A1    Jul. 15, 2010

(30) Foreign Application Priority Data

Dec. 21, 2007 (CN) .......................... 2007 1 0203338

(51) Int. Cl.
*C08J 5/20* (2006.01)
*H01M 2/16* (2006.01)

(52) U.S. Cl. ............. 521/27; 521/25; 429/247; 429/249
(58) Field of Classification Search .................... 521/27, 521/25; 429/247, 249
See application file for complete search history.

(56) References Cited

U.S. PATENT DOCUMENTS
6,153,337 A    11/2000    Carlson et al.
2006/0081530 A1    4/2006    Beard

FOREIGN PATENT DOCUMENTS
CN    1285084 A    2/2001
WO    2007095348 A2    8/2007

OTHER PUBLICATIONS
International Search Report for International Application No. PCT/CN2008/072889.

*Primary Examiner* — Helen O Conley
(74) *Attorney, Agent, or Firm* — Caesar, Rivise, Bernstein, Cohen & Pokotilow, Ltd.

(57) ABSTRACT

Provided are separators used in power accumulators such as lithium ion secondary batteries and a preparation method thereof. The said separators are obtained through following steps: providing a polymer colloidal emulsion through a polymerization reaction of polyvinyl alcohol, hydrophobic monomer and hydrophilic monomer in water solution initiated by an initiator; coating a plastic substrate with the said polymer colloidal emulsion using tape-casting method; drying the plastic substrate coated with the polymer colloidal emulsion, and then obtaining the said separators by delaminating them from the substrate. The said separators have good liquid absorbability, high liquid absorption rate and retention, low resistivity, good mechanical strength and good thermal stability (little thermal shrinkage and little size distortion) as well as electrochemical stability. The prepared lithium ion batteries have good cycle stability and long service life.

10 Claims, No Drawings

MICROPOROUS POLYMER SEPARATORS FOR LITHIUM ION BATTERIES AND METHOD FOR PRODUCING THE SAME

FIELD OF THE INVENTION

The invention relates to a membrane material for energy storage devices such as a lithium-ion secondary battery and a preparation method thereof, which belongs to the field of manufacturing battery and capacitor.

DESCRIPTION OF THE RELATED ART

Microporous polymer membrane is one of the three essential materials for manufacturing lithium-ion battery. The characteristic, pore structure, physicochemical property of material are closely related to electric performance, safety and cycle life of lithium-ion battery. Membrane used for traditional liquid battery is mainly microporous polyolefin membrane, microporous polyvinylidene fluoride membrane and microporous polyolefin membrane/polyvinylidene fluoride membrane composite membrane.

Microporous polyolefin membrane is mainly polyethylene membrane, polypropylene membrane and polyethylene-polypropylene composite membrane. Mechanical two-way stretch method (dry method) and solvent extraction method (wet method) process technology are used to prepare microporous polyolefin membrane. As polyolefins are non-polar materials, the compatibility of polyolefin with electrolyte solution (polar organic solvent) is poor. It plays only the role of a simple mechanical isolation between cathode and anode. The membrane has no fixation to electrolyte which makes most of electrolyte solution exist in the battery in a free state. During charge-discharge cycles, redox side-reaction occurs inevitably between the free electrolyte with anode and cathode materials to consume the electrolyte in battery which results in poor lithium battery. It leads to polarizations increase of battery and easy to form lithium deposition crystal in charge-discharge cycles, which results in membrane piercing phenomenon. It is easy to form dry areas of electrolyte which leads to the phenomenon of electrostatic breakdown caused by the poor absorption of membrane to electrolyte. The two phenomena above-mentioned can easily result in combustion and explosion of lithium-ion battery in severe case. The potential safety hazard of lithium-ion battery constrains its development space used in large-capacity and high-power dynamic-power electrical source.

Polyvinylidene fluoride and its derivatives possess film-forming ability only in the presence of plasticizer. The PVDF membrane containing plasticizer has high performance of self-adhered and relatively low mechanical strength which result in poor process operability. It can not be separately prepared to be microporous polymer membrane like polyolefin resin. The preparation method of such microporous polymer membrane basically adopts the following procedure. The PVDF membrane containing plasticizer and battery electrode of anode and cathode are prepared to be dry battery cell by thermal bonding. Then, organic solvent is used to extract the dry battery cell to form PVDF microporous polymer membrane bonded with anode and cathode. In order to solve the technical difficulty to allow the PDVF microporous polymer membrane to be formed like microporous polyolefin membrane and enhance the operability in preparation of battery, the PVDF solution is coated on microporous polyolefin membrane, and then solvent extraction or phase inversion method is used to prepare microporous polyolefin/polyvinylidene fluoride composite membrane.

In addition, other types of microporous polymer membrane are being researched and developed. For example, Degussa Corporation in Germany uses polymer non-woven as supporter to prepare inorganic microporous ceramic membrane. This non-woven support membrane contains a lot of inorganic fillers which bonded to non-woven through silane adhesive. During drying and use, inevitable piercing phenomenon caused by vibration, bending and folding lead to membrane-coating rugged. Due to uneven current distribution, local voltage increase may lead to current breakdown phenomenon in charge or discharge. S. S. Zhang, et al. prepared P (AN-MMA) microporous polymer membrane using phase inversion method.

SUMMARY OF THE INVENTION

The object of the present invention is to provide a kind of novel membrane, i.e., microporous polymer membrane, used for energy storage devices such as a lithium-ion battery. The membrane has some merits such as low-cost, simple preparation method and green environmental protection. The prepared membrane has good high temperature resistance. It has good security and long cycle life used for secondary battery and other energy storage devices.

In the present invention, water is used as reaction medium. Polymer colloidal emulsion is obtained through polymerization reaction generated by polyvinyl alcohol and multicomponent monomers with different polarities (such as the hydrophobic monomer or hydrophilic monomer). Coating the polymers colloidal emulsion on a plastic baseband using tape-casting techniques, peeling the membrane after drying, the microporous polymer membrane is obtained.

In the present invention, the micropores of membranes are formed under different interaction parameters of each component, because different evaporation rate of various components can form micro-phase separation during film-forming process. Specifically, the microporous polymer membrane provided in the invention is from a colloidal emulsion obtained by polymerization reaction between polyvinyl alcohol and hydrophobic monomer (a certain amount of hydrophilic monomer can also be added) with an initiator in water medium.

The weight ratio of materials for preparing microporous polymer membrane is as follows: 100 parts of polyvinyl alcohol, 0-100 parts of hydrophilic monomer 30-100 parts of hydrophobic monomer, 1-5 parts of initiator. The polyvinyl alcohol has a polymerization degree of 1700-2400 and a hydrolysis degree of 55-99. Preferably, polyvinyl alcohol has a polymerization degree of 1700 and a hydrolysis degree of 99, i.e., PVA1799.

The structure formula of hydrophobic (lipophilic) monomer is $CH_2=CR^1R^2$, wherein, $R^1=-H$ or $-CH_3$; $R^2=-C_6H_5$, $-OCOCH_3$, $-COOCH_3$, $-COOCH_2CH_3$, $-COOCH_2CH_2CH_2CH_3$, $-COOCH_2CH(CH_2CH_3)CH_2CH_2CH_2CH_3$, $-CN$; the hydrophobic monomer comprised at least one of the above-mentioned hydrophobic monomer.

In order to improve the swelling properties of the membrane to electrolyte and enhance affinity of the membrane to electrolyte, etc., the hydrophilic monomer can also be added in the reaction. The preferable amount of the hydrophilic monomer added is 10-100 parts by weight.

The structure formula of the hydrophilic monomer is as follows:

$CHR^3=CR^4R^5$, wherein, $R^3=-H$, $-CH_3$ or $-COOLi$;

$R^4$=—H, —$CH_3$ or —COOLi;
$R^5$=—COOLi, —$CH_2$COOLi, —COO($CH_2$)$_6$$SO_3$Li, —$CONH_2$, —$CONHCH_3$,

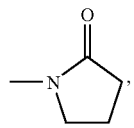

—$CONHCH_2CH_3$, —CON($CH_3$)$_2$, —CON($CH_2CH_3$)$_2$; the hydrophilic monomer comprised at least one selected from the above-mentioned hydrophilic monomer.

The initiator may be ammonium peroxydisulphate, potassium peroxydisulfate, hydrogen peroxide, azobis (2,2'-Azobisisobutyronitrile) which are water soluble initiator, or redox system consisted by the above-mentioned initiator with $Na_2SO_3$ and $FeSO_4$ and so on.

Not more than 3 parts by weight of auxiliary is used as emulsifier which can enhance the stability of colloidal emulsion. The auxiliary can be selected from laurylsulfate, dodecyl benzene sulfonate and vinyl-sulfonate.

The preparation method of microporous polymer membrane described in the present invention comprised the following steps:
(a) Adding polyvinyl alcohol to water, heating and stirring until the solids completely dissolved. If hydrophilic monomer or/and auxiliary is used, simultaneously dissolving in water together with the polyvinyl alcohol.
(b) Then holding the reactor at the required reaction temperature (30-90° C.), adding the hydrophobic monomers containing different components to the reactor at one time or in batches or dropwise, and adding the initiator to initiate the polymerization reaction for 4-35 h to obtain the polymer colloidal emulsion; the initiator can be added dropwisely or in batches.
(c) Adding 5-20% of filler and 50-100% of plasticizer on the basis of 100% solid content of the polymer colloidal emulsion, grinding the mixture with a ball grinder for 5 h to obtain the slurry. Coating the polymer colloidal emulsion on plastic baseband such as BOPP, PET, PE, PP and other plastic baseband using tape-casting techniques, drying and peeling the membrane to obtain the microporous polymer membrane.

The hydrophilic monomer described above can also be added dropwisely or in batches together with hydrophobic monomer and initiator in Step b to allow a stepwise polymerization reaction.

The filler can be extra fine inorganic filler with high specific surface area and strong adsorption capacity that will benefit electrolyte absorption and ion conduction, meanwhile the filler can increase the rigidity of membrane so that in favor of production of energy storage devices. The inorganic filler is mainly selected from oxide, such as silicon dioxide, aluminum oxide, titanium dioxide, zirconium dioxide, magnesia, calcium oxide and fiberglass and so on.

In order to enhance the dispersion of inorganic filler in polymer colloidal emulsion, silane coupling agent can be added. The silane coupling agent can be added during the polymerization reaction by adding the amount of 0.5-5 parts by weight. The silane coupling agent can also be added while adding filler and plasticizer after polymer colloidal emulsion obtained. The addition amount of silane coupling agent added is 0.5-3.0% on the basis of 100% solid content of the polymer colloidal emulsion, The silane coupling agent can be selected from 3-aminopropyltriethoxysilane, [3-(2-Aminoethyl)ami-nopropyl]trimethoxysilane, 3-glycidoxypropyltrimethoxysilane, 3-(methacryloyloxy)propyltrimethoxysilane, vinyltriethoxysilane, vinyltrimethoxysilane and vinyl tri (2-methoxyethoxy) silane.

To enhance the strength and toughness of membrane, micron-sized organic filler can also be added to modify the membrane. The organic filler can be selected at least one from polyethylene powder, polyethylene wax powder or oxidized polyethylene wax powder.

The plasticizer can be glycerol, propylene glycol, polyethylene glycol, benzyl alcohol, isopropanol, phosphate ester and so on.

The microporous polymer membrane described in the present invention is developed on the basis of traditional liquid lithium battery membrane. Neither two-way stretch nor solvent extraction is required to create pores. Instead, it is a completely different pore-forming theory (micro-phase separation method). The phase separation theory is firstly used to prepare microporous polymer membrane in the field of battery membrane. In the present invention, the chemical composition of basic materials of traditional battery membrane is changed. Water is used as reaction medium. Polymer colloidal emulsion with micro-phase separation structure can be obtained by graft copolymerization of multi-component in different polar monomer. The process is environmental friendly and pollution-free. The prepared lithium-ion battery has a good stability and long life cycle.

The characteristics of microporous polymer membrane described in the present invention are as follows:
(1) Having high absorbency, high absorption rate and good hydrophilicity, absorbing and holding the electrolyte of a rated capacity of the battery, and holding higher absorption rate during the whole service life;
(2) having large surface area and high porosity;
(3) being capable of effectively prevent the battery from short-circuit and dendrite penetration due to its small aperture;
(4) having stronger resistance to oxidation and low resistivity;
(5) having higher ion penetrability and good mechanical strength; and
(6) having good thermal stability (less thermal shrinkage and less size distortion), and having good electrochemical stability.

Microporous polymer membrane described in the present invention has abundant and cheap material sources which are processed by the conventional equipment, and has simple operation, stable property and commercial value.

DETAILED DESCRIPTION OF THE PREFERRED EMBODIMENT

The invention is further described in details by reference to Examples, but the invention is not limited to the following embodiments.

EXAMPLE 1

Preparation of Microporous Polymer Membrane

Step 1: Synthesis of Polymer Colloidal Emulsion

In this example, water-soluble polymer emulsion used for lithium-ion battery membrane was prepared through polymerization reaction generated by hydrophilic polymer polyvinyl alcohol (PVA) 1750 and lipophilic monomer vinyl acetate (VAC)/ethylacrylate (EA)/acrylonitrile (AN) in water solution. The composing of copolymer was PVA:VAC:EA:

AN=10:2:2:5 (weight ratio, the same hereinafter). The content of copolymer is 17%. The product was white opaque emulsion.

The polymer emulsion was prepared through following steps: 1000 g distilled water and 100 g polyvinyl alcohol (PVA) 1750 were added to four-neck reaction vessel fixed condenser. The temperature of the reaction vessel was heated to 75° C. under stirring at 100 rpm. After 3 h, the material was transparent like can be regarded as dissolved finished. After natural cooling to 55° C., 40 g mixture of lipophilic monomer vinyl acetate (VAC) and ethyl acrylate (1:1) was added in one time. After stirring for 10 min, 0.5 g of water-soluble initiator (ammonium peroxydisulphate) was added. About 20 minutes later, the material was light blue. The color of the mixture changed into a white emulsion after 30 minutes. The reactive intermediate was obtained after 2 h copolymerization.

The above reaction mixture and 50 g of lipophilic monomer Acrylonitrile (AN) were mixed. 1.5 g of initiator and 0.5 g weakly acidic lithium vinyl sulfonic acid were added. After 10 h reaction, polymer colloidal emulsion was obtained.

Step 2: Preparation of Slurry 19 g of filler (zirconium dioxide) and 160 g of plasticizer (benzyl alcohol) were added to the polymer colloidal emulsion prepared according to Step 1. The mixture was grinded with a ball grinder for 5 h. The viscosity of the slurry at the temperature $T_{slurry}$ of 35° C. was 2500 mpa·s measured at the temperature of 20.6° C. and the relative humidity (RH) of 64%.

Step 3: Coating

Tape-casting equipment was used. Polymer colloidal emulsion was coated on BOPP plastic baseband. The microporous polymer membrane was obtained after the water and plasticizer of the BOPP baseband coated the polymer colloidal emulsion was volatilized through the heated-air drying tunnel. The temperature of heated-air drying was 60-130° C., preferably, 80-100° C.

EXAMPLE 2

Preparation of Microporous Polymer Membrane

Step 1: Synthesis of Polymer Colloidal Emulsion

The reaction steps are basically the same as EXAMPLE 1 The only difference is that the lipophilic monomer ethyl acrylate (EA) was replaced by acrylamide (AM). The composing of copolymer was PVA:VAC:AM:AN=10:2:1:8.

The concrete preparation method of the polymer emulsion is as follows:

All monomers were added in one time. The concentrations of materials were adjusted to about 13%. Initiator was added directly. The slurry experienced colorless-light blue-white emulsion process. The reaction rate was faster than EXAMPLE 1. After 12 h reaction, polymer emulsion used for lithium batteries was obtained.

Step 2: Preparation of Slurry

The amount of filler is the same as EXAMPLE 1. The materials are titanium dioxide and benzyl alcohol. The mixture was grinded with a ball grinder for 5 h. The viscosity of the slurry was kept at 2500 mpa·s by adjusting the solid content at the temperature $T_{slurry}$ of 35° C.

Step 3: The Process is the Same as Example 1

EXAMPLE 3

Step 1: Synthesis of Polymer Colloidal Emulsion

In this example, polyvinyl alcohol 1788 (PVA) was added to lipophilic monomer styrene (St)/butyl acrylate (Ba)/acrylonitrile (AN). Water-soluble polymer emulsion used for lithium-ion battery membrane was prepared by ternary polymerization in aqueous phase. The composing of copolymer was PVA:St:Ba:AN=10:2:4:5 (weight ratio, the same hereinafter). The content of copolymer is 17%. The product was white opaque emulsion.

The polymer emulsion was prepared through following steps: 1000 g distilled water and 100 g polyvinyl alcohol (PVA) 1788 were added to four-neck reaction vessel fixed condenser. The temperature of the reaction vessel was heated to 90° C. under stirring at 100 rpm. After 3 h, the material was transparent like can be regarded as dissolved finished. After natural cooling to 65° C., styrene monomer and a little initiator were added. About 20 minutes later, the mixture became a white emulsion. In the meantime, butyl acrylate (Ba) was added. The reaction was continued for 2 h.

Acrylonitrile monomer was added dropwisely to the above prepared emulsion (The dropwise speed was controlled by peristaltic pump. The material was added to the emulsion during 5 h). 1.5 g of initiator was replenished and the polymerization reaction was continued for 12 h to obtain polymer membrane emulsion used for lithium battery.

Step 2: Preparation of Slurry

15% of filler (silicon dioxide) and 100% of plasticizer (tributyl phosphate) were added to the prepared polymer colloidal emulsion. The mixture was grinded with a ball grinder for 5 h. The viscosity of the slurry was kept at 2500 mpa·s by adjusting the solid content at the temperature $T_{slurry}$ of 35° C.

Step 3: The process is the same as Example 1

EXAMPLE 4

Step 1: Synthesis of Polymer Colloidal Emulsion

In this example, polyvinyl alcohol 1788 (PVA), hydrophilic monomer N-vinyl pyrrolidone (NVP), lipophilic monomer butyl acrylate (Ba) and acrylonitrile (AN) were used as materials for preparation of water-soluble polymer emulsion used for lithium battery membrane. The composing of copolymer was PVA:NVP:Ba:AN=10:2:4:5 (weight ratio).

The polymer emulsion was prepared by one-step polymerization. The monomers and initiators were added simultaneously. The redox system of ammonium sulfite-potassium peroxydisulfate was used as initiator. The reaction temperature was 72° C. and the reaction time was 12 h. The concentration of copolymer is 19.5%. The product was white colloidal emulsion.

Step 2: Preparation of Slurry

15% of filler (silicon dioxide treated with 3-aminopropyl-triethoxysilane) and 100% of plasticizer (tributyl phosphate) were added to the prepared polymer colloidal emulsion. The viscosity of the slurry was kept at 2500 mpa·s by adjusting the solid content.

Step 3: The Process is the Same as EXAMPLE 1

EXAMPLE 5

Step 1: Synthesis of Polymer Colloidal Emulsion

In this example, PVA, hydrophilic monomer lithium acrylate (MAALi) and lipophilic monomer acrylonitrile (AN) were polymerized in aqueous phase to form water-soluble polymer emulsion used for lithium battery membrane. The composing of copolymer was PVA:MAALi:AN=10:2:5 (weight ratio).

The polymer emulsion was prepared through following steps: First, polyvinyl alcohol 1788 was dissolved in water at 50° C. Lithium acrylate (MAALi) and acrylonitrile (AN)

were added in one time. The polymerization method is the same as foregoing EXAMPLE. After 12 h, polymerization reaction was completed.

Step 2: Preparation of Slurry

30% of filler (aluminum oxide) and 120% of plasticizer (triethyl phosphate) were added to the prepared polymer colloidal emulsion. In order to improve the adhesiveness of membrane with BOPP substrate, 35% of oxidized polyethylene wax emulsion was added. The mixture was grinded with a ball grinder for 5 h. The viscosity of the slurry was kept at 2500 mpa·s by adjusting the solid content.

Step 3: The Process is the Same as EXAMPLE 1

EXAMPLE 6

Step 1: Synthesis of Polymer Colloidal Emulsion

In this example, aqueous polymer emulsion used for lithium battery membrane was obtained by graft polymerization of polyvinyl alcohol 1799 (PVA), hydrophobic monomer vinyltriethoxysilane (151)/acrylonitrile (AN) in aqueous phase. The composing of copolymer was PVA:151:AN=10:4:5 (weight ratio).

The polymer emulsion was prepared through following steps: 1000 g distilled water and 100 g polyvinyl alcohol (PVA) 1799 were added to four-neck reaction vessel fixed condenser. The temperature of the reaction vessel was heated to 90° C. under stirring at 100 rpm. After 3 h, the material was transparent like can be regarded as dissolved finished. After natural cooling to 60° C., 40 g of vinyltriethoxysilane 151, 50 g of acrylonitrile (AN) and 1.9 g of ammonium peroxydisulphate were added. The graft polymerization time was 12 h. The concentration of copolymer is 17.4%. The product was white colloidal emulsion.

Step 2: Preparation of Slurry

The polymer colloidal emulsion is adjusted to be weakly acid by diluted hydrochloric acid. 20% of filler (silicon dioxide) filler and 100% of plasticizer (triethyl phosphate) was added. In order to improve the shrinkage performance of membrane, 30% alkali free fiberglass (micron-sized) was attempted added. The fiberglass was sintered at temperature 500° C. before use, then natural cooling. The mixture was grinded with a ball grinder for 5 h. The viscosity of the slurry was kept at 2500 mpa·s by adjusting the solid content.

Step 3: The Process is the Same as EXAMPLE 1

Absorption Amount of the Membrane Prepared by example 1-6

The microporous polymer membranes prepared by EXAMPLE 1-6 were dried for 3-8 h in a vacuum at 90° C. The whole testing process was carried out in dry air atmosphere (the relative humidity of dry air atmosphere was below 3%). The membranes were taken out after 2, 4, 6, 12 h dipping in electrolyte, respectively. The residual electrolyte on surface was blotted up by filter paper. The sample was weighed using analytical balance of 0.01 g accuracy. The weight difference before and after dipping in the electrolyte is the absorption amount. After 12 h dipping in electrolyte, the membranes were taken out and deposited for 3 h. The electrolyte conservation rate of water-soluble polymer membranes was determined (the absorption amount to the weight difference of 12 h dipping). The results of contrast experiment of EXAMPLE and PP membrane are shown in Table 1.

TABLE 1

Data of liquid absorption rate
Electrolyte LB305

| Type | Soak time | Dry film weight | Wet film weight | Absorption amount | Absorption rate |
|---|---|---|---|---|---|
| PP | 2 | 23 | 35 | 12 | 52% |
|  | 4 | 23 | 37 | 14 | 60% |
|  | 6 | 23 | 38 | 15 | 65% |
|  | 12 | 23 | 38 | 15 | 65% |
| EXAMPLE 1 | 2 | 25 | 44 | 19 | 76% |
|  | 4 | 25 | 49 | 24 | 96% |
|  | 6 | 25 | 53 | 28 | 112% |
|  | 12 | 25 | 53 | 28 | 112% |
| EXAMPLE 3 | 2 | 24 | 40 | 16 | 67% |
|  | 4 | 24 | 44 | 20 | 83% |
|  | 6 | 24 | 49 | 23 | 95% |
|  | 12 | 24 | 50 | 25 | 96% |
| EXAMPLE 4 | 2 | 25 | 43 | 18 | 72% |
|  | 4 | 25 | 48 | 23 | 92% |
|  | 6 | 25 | 50 | 25 | 100% |
|  | 12 | 25 | 50 | 25 | 100% |
| EXAMPLE 6 | 2 | 24 | 39 | 15 | 62% |
|  | 4 | 25 | 44 | 19 | 76% |
|  | 6 | 25 | 45 | 20 | 83% |
|  | 12 | 25 | 46 | 21 | 84% |

EXAMPLE 7

A Lithium-Ion Battery Containing the Microporous Polymer Membrane of Invention

The microporous polymer membrane prepared in EXAMPLE 6 was assembled into a lithium-ion battery. The battery was composed of the $LiMn_2O_4$ cathode material, graphite anode materials, and electrolyte $LiPF_6$ consisting of ethylene carbonate/diethyl carbonate. The battery is subject to a DOD 100% charge-discharge cycle under a condition of 1 C. The results of experiments showed that the capacity of battery remained over 75% than initial capacity after 1500 charge-discharge cycle. The increase of internal resistance in battery was less than 10%. As a contrast, the lithium-ion battery assembled by commercial microporous polypropylene film under the same conditions has the capacity about 75% of initial capacity and the internal resistance increases more than 35% after 400 cycles under the same condition.

The lithium-ion battery assembled by microporous polymer membrane prepared in present invention has long cycle life and smaller battery polarization attributed to the microporous polymer membrane has excellent affinity with the polar electrolyte solution and excellent liquid retention property which is made from a high-polarity polymer material.

What is claimed is:

1. A microporous polymer membrane for a lithium-ion battery, wherein the membrane is obtained by the following steps:
   providing water as a reaction medium,
   conducting a polymerization reaction between polyvinyl alcohol and a hydrophobic monomer with an initiator in a water solution to obtain a colloidal emulsion of polymers,
   coating the colloidal emulsion of polymers on a plastic baseband using tape-casting techniques,
   drying the colloidal emulsion of polymers on the plastic baseband to provide the membrane, and
   peeling the membrane from the plastic baseband after drying.

2. The microporous polymer membrane according to claim 1, wherein the polymerization reaction also includes hydrophilic monomer.

3. The microporous polymer membrane according to claim 1, wherein:
(a) a weight ratio of materials for preparing the microporous polymer membrane is as follows: 100 parts of polyvinyl alcohol, 0-100 parts of hydrophilic monomer, 30-100 parts of hydrophobic monomer, 1-5 parts of initiator;
(b) a polymerization degree of the polyvinyl alcohol is 1700-2400 and a hydrolysis degree of the polyvinyl alcohol is 50-99;
(c) a structural formula of the hydrophobic monomer is $CH_2=CR^1R^2$, wherein $R^1$ =—H or —$CH_3$; and $R^2$ =—$C_6H_5$, —$OCOCH_3$, —$COOCH_3$, —$COOCH_2CH_3$, —$COOCH_2CH_2CH_2CH_3$, —$COOCH_2CH(CH_2CH_3)CH_2CH_2CH_2CH^3$, or —CN; the hydrophobic monomer being at least one species defined by the structural formula of the hydrophobic monomer;
(d) a structural formula of the hydrophilic monomer is $CHR^3=CR^4R^5$, wherein
$R^3$=—H, —$CH_3$ or —COOLi;
$R^4$=—H, —$CH_3$ or —COOLi; and
$R^5$=—COOLi, —$CH_2$COOLi, —$COO(CH_2)_6SO_3Li$, —$CONH_2$, —$CONHCH_3$,

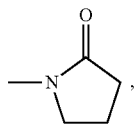

—$CONHCH_2CH_3$, —$CON(CH_3)_2$, or —$CON(CH_2CH_3)_2$; the hydrophilic monomer being at least one species defined by the structural formula of the hydrophilic monomers;
(e) the initiator is ammonium peroxydisulphate, potassium peroxydisulfate, hydrogen peroxide, azobis(isobutylamidine hydrochloride), or a redox system thereof.

4. The microporous polymer membrane according to claim 3, wherein the polymerization reaction also includes not more than 3 parts of an auxiliary agent by weight, used as an emulsifier, and the auxiliary agent is a member selected from the group consisting of laurilsulfate, dodecyl benzene sulfonate and vinyl-sulfonate.

5. The microporous polymer membrane according to claim 3, wherein the polymerization reaction also includes 0.5-5 parts by weight of a silane coupling agent.

6. A preparation method of the microporous polymer membrane according to claim 3, comprising the following steps:
(a) Adding polyvinyl alcohol to water with heating and stirring until the solids are completely dissolved;
(b) Maintaining a temperature of a reactor at 30-90° C., adding hydrophobic monomers containing different components and hydrophilic monomers containing different components to the reactor at one time or in batches, adding initiator to the reactor to initiate the polymerization reaction for 4-35h to obtain the colloidal emulsion of polymers;
(c) Adding to the colloidal emulsion of polymers 5-20% of filler, 0.5-3.0% of silane coupling agent and 50-100% of plasticizer on the basis of 100% solid content of the prepared colloidal emulsion of polymers, ball milling for 5h to obtain a slurry, coating the slurry on a plastic baseband by a cast coating process, and drying to obtain the microporous polymer membrane, wherein the plastic baseband is BOPP, PET, PE or PP.

7. The preparation method of the microporous polymer membrane according to claim 3, comprising the following steps:
(a) adding the hydrophilic monomers, the auxiliary agent and the polyvinyl alcohol to water with heating and stirring to be dissolved completely;
(b) maintaining a reactor at a temperature of 30-90 ° C., adding the hydrophobic monomers containing different components to the reactor at one time or separately or dropwise, and adding the initiator to initiate the polymerization reaction for 4-35 h to obtain the colloidal emulsion of polymers; and
(c) adding to the colloidal emulsion of polymers 5-20% of the filler, 0.5-3.0% of the silane coupling agent and 50-100% of the plasticizer on the basis of 100% solid content of the colloidal emulsion of polymers, ball milling the mixture for 5 h to obtain a slurry, coating the slurry on the plastic baseband by the cast coating process, and drying to obtain the microporous polymer membrane, wherein the plastic baseband is BOPP, PET, PE or PP.

8. The preparation method of claim 6, wherein the filler is at least one of inorganic filler and organic filler, and wherein:
(a) the inorganic filler is at least one oxide selected from the group consisting of silicon dioxide, aluminum oxide, titanium dioxide, zirconium dioxide, magnesia, calcium oxide, and fiberglass; (b) the plasticizer is at least one member selected from the group consisting of glycerol, propylene glycol, polyethylene glycol, benzyl alcohol, isopropanol, and phosphate ester; (c) the organic filler is at least one member selected from the group consisting of polyethylene powder, polyethylene wax powder and oxidized polyethylene wax powder.

9. The preparation method according to claim 8, wherein: 0.5-3.0% of a silane coupling agent is also added on the basis of 100% solid content of the colloidal emulsion of polymers in the step c, and the silane coupling agent is at least one of 3-aminopropyltriethoxysilane, [3-(2-aminoethyl)aminopropyl]trimethoxysilane, 3-glyeidoxypropyltrimethoxysilane, 3-(methacryloyloxy)propyltrimethoxysilane, vinyltriethoxysilane, vinyltrimethoxysilane and vinyl tris(2-methoxyethoxy) silane.

10. Application of the microporous polymer membrane according to claim 1 as a non-aqueous electrolyte membrane to an energy storage device.

* * * * *